United States Patent Office 3,285,440
Patented Nov. 15, 1966

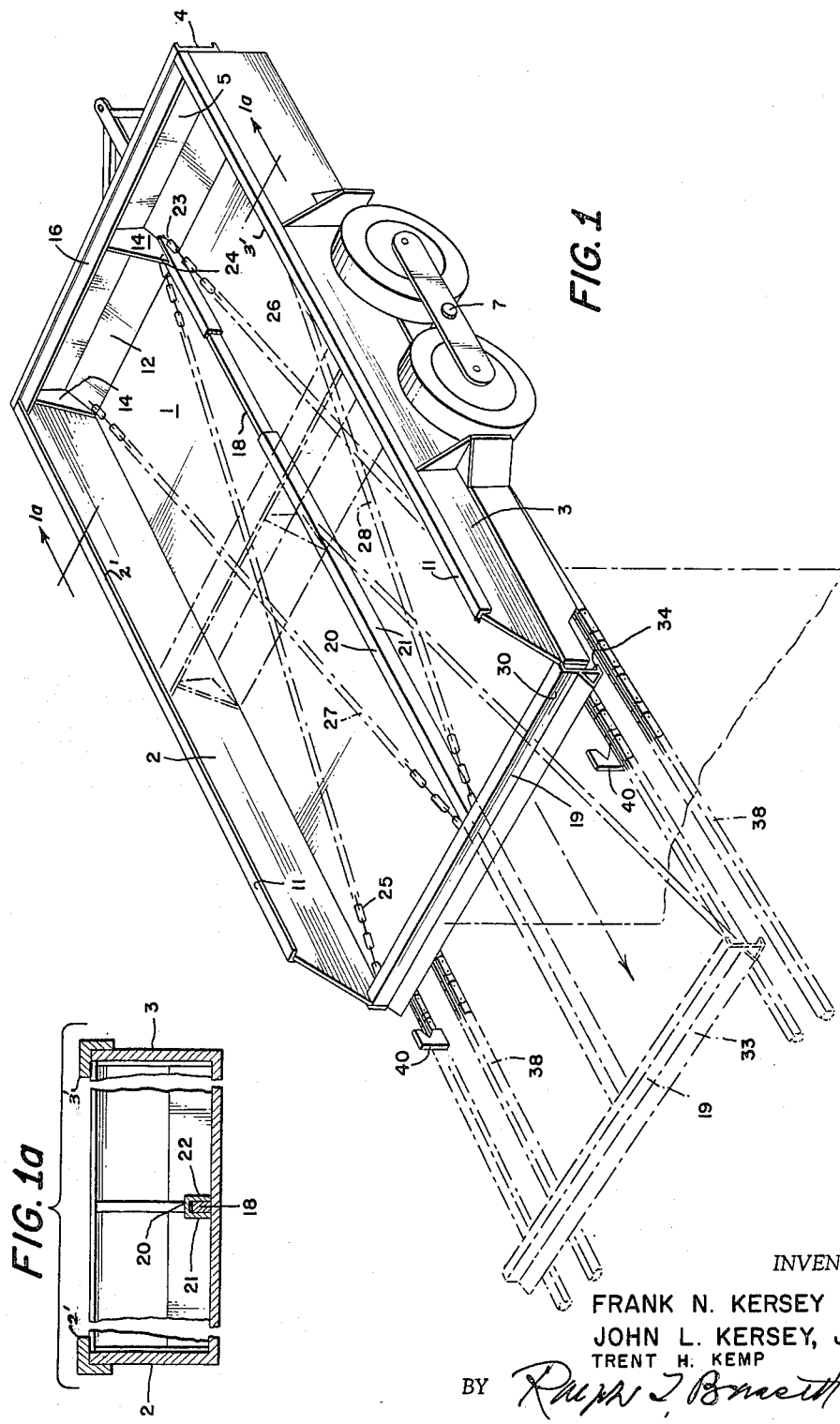

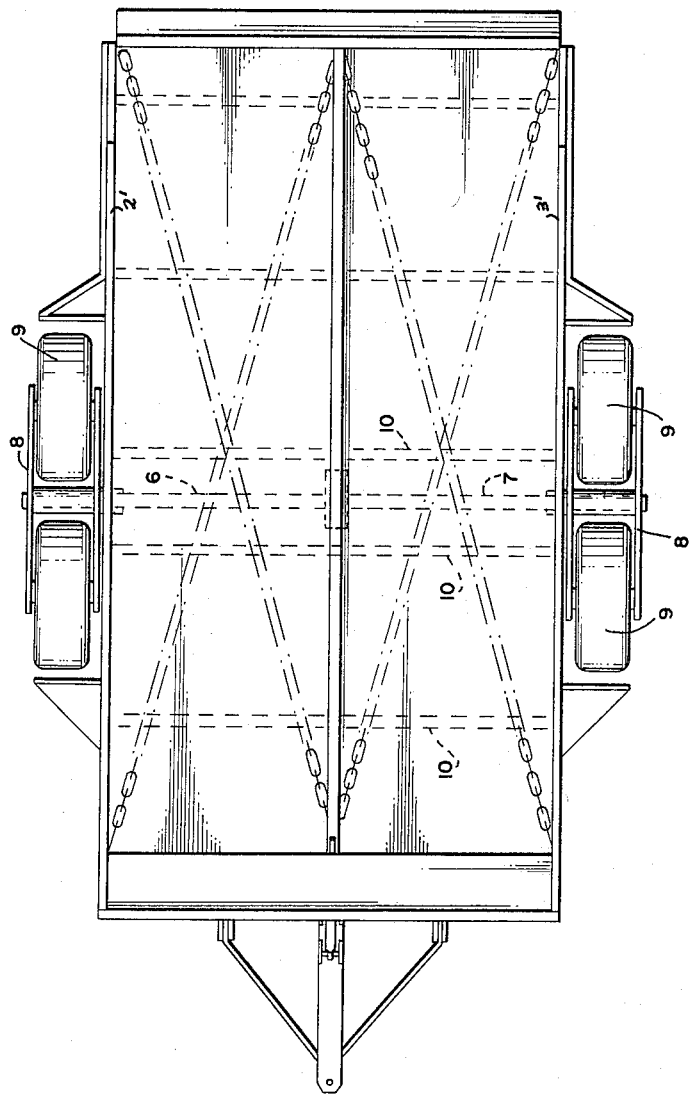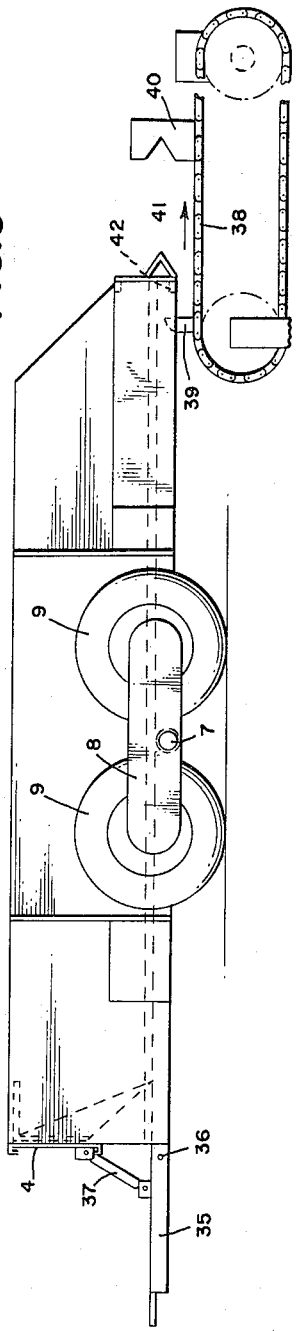

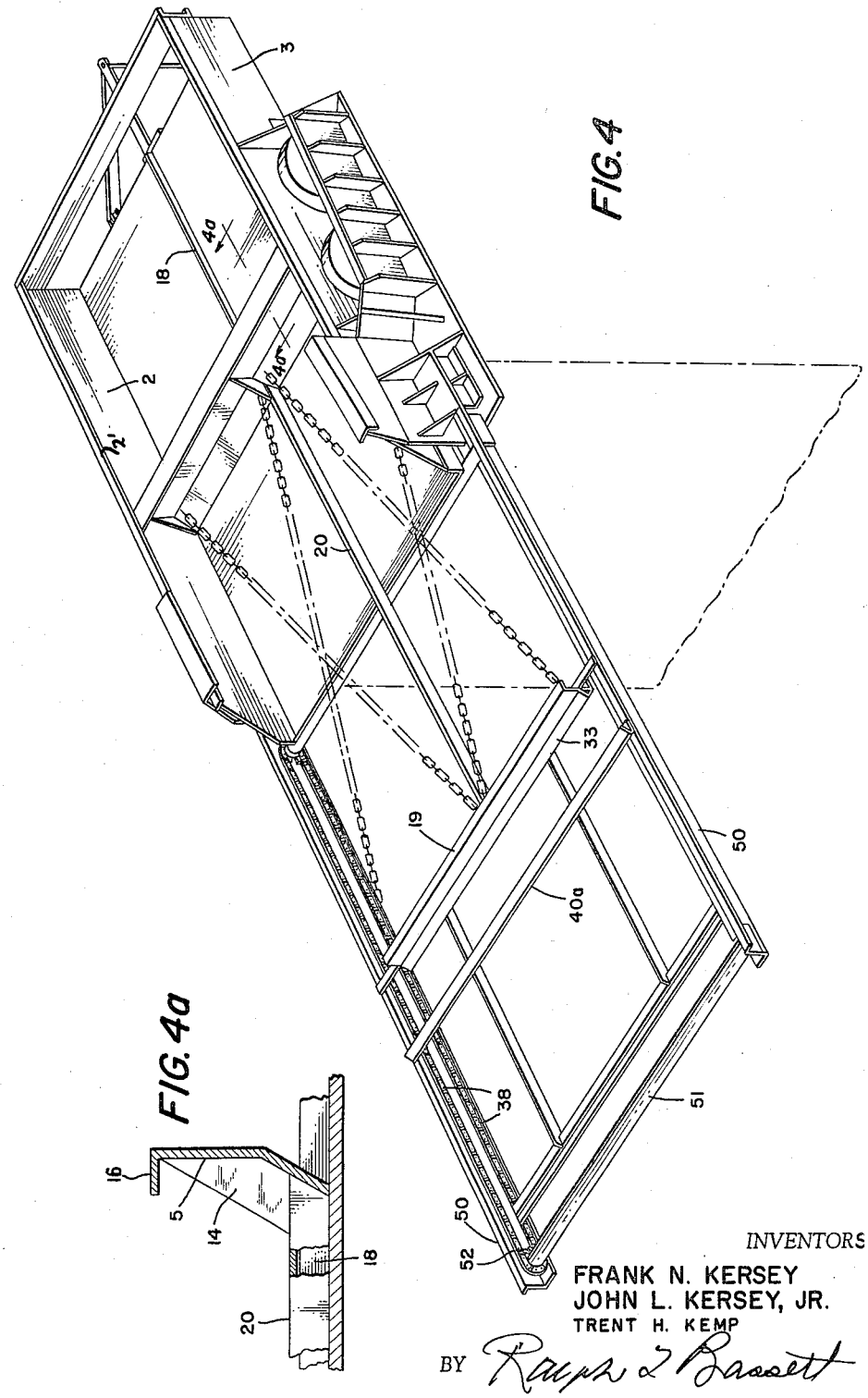

3,285,440
UNLOADING APPARATUS FOR CARS AND TRUCKS
Frank N. Kersey, John L. Kersey, Jr., and Trent H. Kemp, Bluefield, Va., assignors to "Automatic" Sprinkler Corporation of America, Youngstown, Ohio, a corporation of Ohio
Filed July 28, 1964, Ser. No. 385,736
11 Claims. (Cl. 214—44)

This invention relates to mechanism for rapidly dumping conventional mine cars, trucks or trailers, and particularly where the unloading is accomplished without a tilting or turning operation of the lading assembly.

One of the objects of the invention is to provide a controlled rate of lading discharge through the open end of a car by the use of simple internal lading moving means associated with an external power actuator in the form of hooked endless chains.

More specifically, the invention embodies the use of a sliding end gate at the end of a car and the travel of the end gate throughout the length of the car by a multiplicity of cross chains connected to a false bumper at the opposite end of the car, the chains providing constant travel of the lading through the movement of the end gate without a build-up or boiling over of the lading during the unloading operation.

Another object of the invention is the provision of means for the return of the end gate to its initial position against a fixed end wall portion by the reversal of the same mechanism used to provide the unloading operation.

More specifically the invention comprehends the use of a mine car including a body comprising sidewalls, a floor and a fixed end structure all mounted on pivoted wheels mounted on torque rods extending transversely beneath the medial portion of the car body, the floor of the car being constructed for the travel of a moving end gate and a multiplicity of cross chains connected to a false bumper for the unloading operation and a longitudinal rigid connecting member between the traveling end gate and the false bumper for the return operation of the end gate.

These and other objects of the invention will more clearly hereinafter appear by reference to the accompanying drawings forming a part of the instant specification and wherein like characters of reference designate corresponding parts throughout the several views, in which:

FIG. 1 is a perspective view showing a mine car of the type in question with the position of the unloading parts approximately one-half way through the unloading operation;

FIG. 1a is a transverse section through the brace or connection showing the guide rail;

FIG. 2 is a top plan view of the invention;

FIG. 3 is a side elevation;

FIG. 4 is a view similar to FIG. 1 showing a modified form of car assembly; and

FIG. 4a is an enlarged fragmentary view, partly in section, showing the medial structure of the sliding end gate.

The car structure in each of the illustrations includes generally a car floor 1 sidewalls 2 and 3, a fixed end wall 4, and a sliding gate 5, the sidewalls including inturned longitudinal extending flanges at their upper edges indicated at 2' and 3'. The car body is mounted on torque rod structures 6 and 7 at the outer ends of which are the pivoted wheel hangers 8 supporting wheels 9 of the type shown in our prior application Serial No. 317,874, now Patent No. 3,241,855. The transverse brace frames are shown at 10 in FIG. 2 and support the flooring sheets forming the floor 1. The sidewalls 2 and 3 of the car are provided with inturned flanges 11 to reinforce these parts, while the fixed end wall 4 is built of relatively heavy material in the nature of a semi I-beam or the like and extends from sidewall to sidewall, as shown, but terminates generally medial of the vertical distance of the sidewalls.

The sliding gate or sliding end wall 5 consists of a vertical plate extending from sidewall to sidewall and an angular bottom plate section 12 which is designed to travel over the floor 1 and because of its angular arrangement with respect to the floor, to clean the floor of the lading contained in the car. Transverse braces or gussets 14 are provided at each end at the central portion of the sliding gate 5 and their arrangement and structure provides strength and rigidity essential to its operational function. The upper part of the sliding gate 5 has a horizontal inwardly extending brace 16 overlying and connected to the structure including the top portions of the braces 14. This structure provides a rigid traveling gate assembly capable of movement throughout the length of the car structure with the end braces or gussets 14 lying flush against the inner faces of the car sides 2 and 3 to prevent lateral distortion of the gate and insuring its proper longitudinal movement within the car body.

Extending longitudinally of the car and medially thereof is a track member 18 welded to the floor surface throughout its length which forms a support and guide for the inverted U-shaped brace and connector extending between the sliding gate 5 and the movable end structure and false bumper 19. The inverted U-shaped connector includes a horizontal central portion 20 and the depending flanges 21 and 22. The brace and connector 20–22 has a tapered end wall portion 23 welded to the angular bottom plate 12 beneath the medial brace or shear plate 14, the latter having its bottom end portion 24 seated upon the top thereof and welded thereto. This provides a rigid reinforced assembly in the medial portion of the sliding gate. The opposite end of the connector 20–22 is connected to the inner wall of the false bumper member 19 so that when the member 19 is moved outwardly of the car by suitable mechanism, to be hereinafter described, the connector 20–22 will cause the sliding gate 5 to travel along the bottom of the car in a uniform manner and generally in a plane normal to the plane of the sidewalls 2 and 3. In addition to the connector 20–22 there are provided a plurality of angularly arranged chains between the sliding gate 5 and the false bumper 19, these chains being shown as four in number and two of which, namely, the chains 25 and 26, are connected to the outer end portions of the member 19 and the central portion of the sliding gate 5, while the other two cross chains 27 and 28 are reversely arranged, i.e. are connected to the central portion of the member 19 and the end portions of the sliding gate, as clearly shown in FIG. 1.

The bumper member 19 consists in an inwardly facing channel 30 which extends above and below the floor 1 and a V-shaped outer plate 33 which extends longitudinally of the member 30 at its bottom outer portion, as shown at 31, for engagement with the actuating mechanism when the gate is moved towards its closed position. The vertical channel 30 which extends beneath the car floor, as at 34, cooperates with another portion of the unloading mechanism for actuating the sliding end gate 5 towards open position.

A tow or hitch member 35 is fixed to the central portion of the car at the end accommodating the sliding gate 5 and is hinged at 36 to provide flexibility between the mine tractor and the car. A buffer or spring 37 connects the tow bar 35 with the fixed end wall 4 of the car structure, thereby bracing the parts and retaining the car against unsuitable vertical distortion during its travel.

In FIG. 3 an unloading means is illustrated in the form of a power driven endless chain 38 having a suitable source of power and including reversing mechanism whereby this chain can be driven in either direction under control from a suitable source. A pair of these chains are provided, one at each side of the car, as shown in FIG. 1, and carried by these chains are the drive pins 39 or hooks (see FIG. 3) for use in the unloading operation and the drive hook arms 40 for returning the end gate and chains to their normal position within the car. Upon movement of the chain 38 in the direction of the arrow 41, the hooks 39 will engage the flange 42 at the bottom of the angle plate 30 and move the assembly 19 outwardly, as shown in dotted line in FIG. 1, causing the sliding gate 5 and the chains 25–28 to unload the lading and to discharge same out of the open end of the car.

The connector 20, traveling on its track 18 and the provision of the side plates 14 operating against the inner side faces of the sidewalls 2 and 3 of the car, will normally retain the sliding gate 5 in its proper transverse relationship with the floor 1. The same function will be accomplished by the use of the chains 25–26–27 and 28 which not only provide a discharge bearing for the bottom of the lading on the car floor 1 but will also assist in maintaining the gate in proper association with the floor and sidewalls of the car and cause a gradual even delivery of the lading out of the open end of the car without any tendency of the lading to boil up and discharge over the side walls of the structure.

In FIG. 4 there is illustrated a frame carrying the loading and unloading chain mechanism 38, including the side frame 50 connected at one end by the cross member 51 having sprockets at each end, one of which is shown at 52. In this view the end structure 19 is positioned generally at a midway point in the unloading operation while the return hook for moving this frame 19 to close the end gate is shown in the form of an angle member 40a. In this form the member 40a will entirely engage the angle plate 33 of the end structure 19 and insure stabilization of the return operation.

The car illustrated in FIG. 4 is of a modified form including other features not forming a part of the instant invention other than to illustrate the adaptation of the instant unloading mechanism to cars of many types including conventional cars now in use and which can be converted and used with the instant development.

What we claim is:

1. In a dump truck assembly comprising a body including sidewalls and a floor, spaced wheels at each side of said truck for mounting said body, said wheels being rockably supported on torque rods extending beneath the truck floor, an end wall structure for one end of the body, said end wall being adapted for sliding movement longitudinally of the floor structure, a bumper member at the opposite end of the truck, a rigid connecting member fixed to the center portion of the sliding end wall structure and connected at its opposite end portion to said bumper member, said bumper member extending transversely of the truck body with its upper and lower marginal edges above and below the truck floor, guide means projecting from the longitudinal medial center of the floor for engaging the sidewalls of the longitudinally extending connecting element to prevent the lateral displacement of the same during sliding movement of the end structure and the bumper, power means engaging the inner face of the bumper member for moving the bumper and the end structure outwardly to discharge lading from said truck, and additional power means for engaging the outer face of the bumper for returning the end structure and the bumper to their normal positions at the respective ends of the truck.

2. The structure of claim 1 characterized in that the end structure includes a vertical plate extending from sidewall to sidewall of the body and an inwardly projecting angularly disposed bottom plate connected with the vertical plate by spaced braces.

3. The structure of claim 1 characterized in that the end wall structure includes a vertical plate extending from sidewall to sidewall of the body and an inwardly projecting angularly disposed bottom plate connected with the vertical plate by spaced braces, said braces being positioned for abutting association with the inner sidewalls of the body to prevent displacement of the end wall structure during its travel along the floor.

4. The structure of claim 1 characterized in that the sliding end wall structure includes a vertical plate and an inwardly projecting angular plate, the lower end of which is adapted to move along the surface of the floor during travel of the end wall and a medial brace connected at its bottom portion to the top surface of the rigid connecting member.

5. The structure of claim 1 characterized in that the rigid connecting member is in the form of an inverted U-shaped channel.

6. The structure of claim 1 characterized in that the rigid connecting member between the end wall and the bumper is in the form of an inverted channel in cross section and the guide means projecting from the longitudinal medial center of the floor is in the form of an upwardly projecting track welded to the floor and projecting into the connecting member throughout its length.

7. The structure of claim 1 characterized in that the bumper member is in the form of a channel having its marginal flanges projecting inwardly above and below the floor and includes a V-shaped plate extending throughout its length at the outer bottom portion of its structure.

8. The structure of claim 1 characterized in that the end wall structure includes at its upper portion a horizontally inwardly projecting flange which has its terminals abutting inturned flanges formed along the upper marginal edges of the sidewalls.

9. In a dump truck assembly comprising a body including sidewalls and a floor, spaced wheels at each side of said truck for mounting said body, a sliding end wall structure relative to said side walls and floor for one end of said body, a false bumper member positioned at the opposite end of said body and movable with said end wall, a connecting member extending between the medial portions of the end wall and the bumper member for retaining the same in pre-determined spaced relation, a plurality of chains extending along the floor throughout the length thereof between and secured to the end wall structure and the bumper at each side of the connecting member and adapted to travel along the floor surface during movement of the end wall and bumper, and power means adapted to engage the bumper member for moving the same towards and away from the truck for removal of the lading by said end wall and chains.

10. The structure of claim 9 characterized in that an upstanding track member is welded to the upper face of the floor of the truck body medially and longitudinally thereof and the connecting member includes portions which embrace the side portions of the upstanding track member.

11. The structure of claim 9 characterized in that the end wall structure includes at its upper portion a horizontally inwardly projecting flange which has its terminals abutting inturned flanges formed along the upper marginal edges of the sidewalls.

References Cited by the Examiner
UNITED STATES PATENTS 2,529,608  11/1950  Hueneman _____ 214—82
2,810,486  10/1957  Elton _____ 214—82

GERALD M. FORLENZA, *Primary Examiner.*

ROBERT G. SHERIDAN, *Examiner.*